(12) United States Patent
Dashiell

(10) Patent No.: US 6,790,493 B2
(45) Date of Patent: Sep. 14, 2004

(54) EPOXY CURING AGENT EMULSIFICATION FOR TTR APPLICATION

(75) Inventor: David M. Dashiell, Miamisburg, OH (US)

(73) Assignee: NCR Corporation, Dayton, OH (US)

( * ) Notice: Subject to any disclaimer, the term of this patent is extended or adjusted under 35 U.S.C. 154(b) by 42 days.

(21) Appl. No.: 10/036,724

(22) Filed: Dec. 21, 2001

(65) Prior Publication Data

US 2003/0118834 A1 Jun. 26, 2003

(51) Int. Cl.[7] .................. B41M 5/40; B32B 27/38
(52) U.S. Cl. .................. 428/32.87; 428/32.72; 428/32.73; 428/32.83; 428/32.84; 428/32.86; 428/413; 428/414
(58) Field of Search .................. 428/413, 414, 428/484, 32.69, 32.7, 32.72, 32.73, 32.83, 32.84, 32.86, 32.87; 523/400, 440; 528/87, 88, 93; 347/171

(56) References Cited

U.S. PATENT DOCUMENTS

| | | |
|---|---|---|
| 3,663,278 A | 5/1972 | Blose et al. |
| 4,315,643 A | 2/1982 | Tokunaga et al. |
| 4,403,224 A | 9/1983 | Wirnowski |
| 4,463,034 A | 7/1984 | Tokunaga et al. |
| 4,628,000 A | 12/1986 | Talvalkar et al. |
| 4,687,701 A | 8/1987 | Knirsch et al. |
| 4,707,395 A | 11/1987 | Ueyama et al. |
| 4,777,079 A | 10/1988 | Nagamoto et al. |
| 4,778,729 A | 10/1988 | Mizobuchi |
| 4,923,749 A | 5/1990 | Talvalkar |
| 4,975,332 A | 12/1990 | Shini et al. |
| 4,983,446 A | 1/1991 | Taniguchi et al. |
| 4,988,563 A | 1/1991 | Wehr |
| 5,128,308 A | 7/1992 | Talvalkar |
| 5,240,781 A | 8/1993 | Obata et al. |
| 5,248,652 A | 9/1993 | Talvalkar |
| 5,328,754 A | 7/1994 | Yuyama et al. |
| 5,952,098 A | 9/1999 | Lorenz et al. |
| 6,149,747 A * | 11/2000 | Lorenz et al. ........... 156/89.11 |
| 6,172,142 B1 | 1/2001 | Lorenz et al. |

FOREIGN PATENT DOCUMENTS

| | | |
|---|---|---|
| EP | 0 111 004 | 6/1984 |
| JP | 05 016533 | 1/1993 |

OTHER PUBLICATIONS

Epon Resins and Modifiers: Resolution Performance Products—p. 12.*
Physical Properties Guide for Epoxy Resins and Related Products: Resolution Performance Products—p. 26.*
Product Data sheet for Araldite GT 7013—Jubail Chemical Industries Company.*

* cited by examiner

Primary Examiner—Philip C. Tucker
Assistant Examiner—Michael J. Feely
(74) Attorney, Agent, or Firm—Millen White Zelano & Branigan PC

(57) ABSTRACT

An aqueous coating formulation which forms a thermal transfer layer of a thermal transfer ribbon. This formulation comprises an aqueous emulsion of a thermoplastic resin and/or wax coemulsified with an epoxy curing agent. This emulsion can be combined with an aqueous dispersion of an epoxy resin. These coating formulations provide thermal transfer layers with reactive components that increase in molecular weight when heated during transfer to provide images with high scratch and smear resistance without organic solvents. The reactive components are maintained in separate phases within the same thermal transfer layer or separate thermal transfer layers until exposed to a thermal print head.

19 Claims, 2 Drawing Sheets

EPOXY CURING AGENT EMULSIFICATION FOR TTR APPLICATION

FIELD OF THE INVENTION

The present invention relates to thermal transfer media used in thermal transfer printing and coating formulations used to produce them. Images are formed on a receiving substrate by heating extremely precise areas of a thermal transfer medium with thin film resistors. This heating of the localized areas causes transfer of ink from the thermal transfer medium to the receiving substrate.

BACKGROUND OF THE INVENTION

Thermal transfer printing has displaced impact printing in many applications due to advantages such as the relatively low noise levels which are attained during the printing operation. Thermal transfer printing is widely used in special applications such as in the printing of machine readable bar codes and magnetic alpha-numeric characters. The thermal transfer process provides great flexibility in generating images and allows for broad variations in style, size and color of the printed image. Representative documentation in the area of thermal transfer printing includes the following patents and publications.

U.S. Pat. No. 3,663,278, issued to J. H. Blose et al. on May 16, 1972, U.S. Pat. No. 4,315,643, issued to Y. Tokunaga et al. on Feb. 16, 1982, U.S. Pat. No. 4,403,224, issued to R. C. Winowski on Sep. 6, 1983, U.S. Pat. No. 4,463,034, issued to Y. Tokunaga et al. on Jul. 31, 1984, U.S. Pat. No. 4,628,000, issued to S. G. Talvalkar et al. on Dec. 9, 1986, U.S. Pat. No. 4,687,701, issued to K. Knirsch et al. on Aug. 18, 1987, U.S. Pat. No. 4,707,395, issued to S. Ueyama et al., on Nov. 17, 1987, U.S. Pat. No. 4,777,079, issued to M. Nagamoto et al. on Oct. 11, 1988, U.S. Pat. No. 4,778,729, issued to A. Mizobuchi on Oct. 18, 1988, U.S. Pat. No. 4,923,749, issued to Talvalkar on May 8, 1990, U.S. Pat. No. 4,975,332, issued to Shini et al. on Dec. 4, 1990, U.S. Pat. No. 4,983,446, U.S. Pat. No. 4,988,563, issued to Wehr on Jan. 29, 1991, U.S. Pat. Nos. 5,128,308 and 5,248,652, issued to Talvalkar, U.S. Pat. No. 5,240,781, issued to Obatta et al. U.S. Pat. No. 5,328,754 issued to Yugama et al., EP 0111004 published in June of 1984, Patent Abstracts of Japan, Vol. 17, No. 286 (M-1422), published on Jun. 2, 1993 and JP 05 016533, filed by Ricoh K. K., which published on Jan. 26, 1993.

Many attempts have been made to provide high integrity thermal transfer printing which is resistant to scratching and smearing, some of which are described above. Examples are U.S. Pat. Nos. 5,128,308 and 5,248,652 issued to Talvalkar.

U.S. Pat. Nos. 5,952,098 and 6,172,142, issued to Lorenz described thermal transfer media which contain epoxy resin binder and crosslinker in separate phases and coating formulations which produce them.

Government legislation has made the reduction in the use of organic solvents increasingly attractive. As such, it is desirable to use water as a carrier solvent for coating formulations.

SUMMARY OF THE INVENTION

The present invention provides aqueous coating formulations for preparing thermal transfer layers of thermal transfer media and also thermal transfer media obtained with these aqueous coating formulations.

One embodiment of this invention is an aqueous coating formulation which forms a thermal transfer layer of a thermal transfer medium having a softening point below 200° C. This coating formulation comprises an aqueous emulsion of at least one thermoplastic resin and/or wax and at least one epoxy curing agent which initiates crosslinking with an epoxy resin and is coemulsified with the one or more thermoplastic resins and/or waxes. The coating formulation comprises an aqueous liquid which does not solubilize the epoxy curing agents or the thermoplastic resins or waxes. Each of the epoxy curing agents, thermoplastic resins and waxes has a softening point below 200° C. The thermoplastic resins and waxes are solid at 20° C. and the epoxy curing agent is either solid at 20° C. or encapsulated in a wax or thermoplastic resin which is solid at 20° C.

Another embodiment of this invention is an aqueous coating formulation which forms a thermal transfer layer of a thermal transfer medium having a softening point below 200° C. which comprises a combination of a) an aqueous emulsion of at least one thermoplastic resin and/or wax coemulsified with at least one epoxy curing agent which initiates crosslinking with an epoxy resin and b) an aqueous dispersion of at least one epoxy resin. This aqueous coating formulation comprises an aqueous liquid which does not solubilize the epoxy curing agents, thermoplastic resins, waxes or the epoxy resins. The epoxy resins, epoxy curing agents, thermoplastic resin and waxes each have a softening point below 200° C. so as to melt mix at a temperature in the range of 50° C. to 250° C. The thermoplastic resins and waxes are solid at 20° C. and the epoxy curing agent is either solid at 20° C. or encapsulated in a wax or thermoplastic resin which is solid at 20° C.

In another aspect of this invention, there is provided thermal transfer media obtained from the aqueous coating formulations of this invention. One embodiment of these thermal transfer media comprises a flexible substrate and a single thermal transfer layer which has a softening point below 200° C. obtained from an aqueous coating formulation of this invention. This single thermal transfer layer comprises at least one epoxy resin, at least one curing agent which initiates crosslinking with the epoxy resin and at least one thermoplastic resin and/or wax, where each epoxy curing agent is dispersed within the one or more thermoplastic resins and/or waxes and separated from each epoxy resin so as to not react without melt mixing. Each of the epoxy resins, epoxy curing agents, thermoplastic resins and waxes are solid at 20° C. and have a softening point below 200° C. so as to melt mix at a temperature in the range of 50° C. to 250° C.

Another embodiment of the thermal transfer media of this invention comprises a flexible substrate and two thermal transfer layers, each having a softening point below 200° C. The first layer comprises at least one epoxy resin and the second layer is obtained from an aqueous coating formulation of the present invention comprising at least one epoxy curing agent which initiates crosslinking with the epoxy resin, and at least one thermoplastic resin and/or wax, wherein each epoxy curing agent is dispersed within the thermoplastic resin and/or wax and is separate from the layer of epoxy resin so as not to react with the epoxy resin without melt mixing. Each of the epoxy resins, epoxy curing agents, thermoplastic resins and waxes are solid at 20° C. and have a softening point below 200° C. so as to melt mix at a temperature in the range of 50° C. to 250° C. The thermoplastic resins and waxes are solid at 20° C. and the epoxy curing agent is either solid at 20° C. or encapsulated in a wax or thermoplastic resin which is solid at 20° C.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

Figure 1:
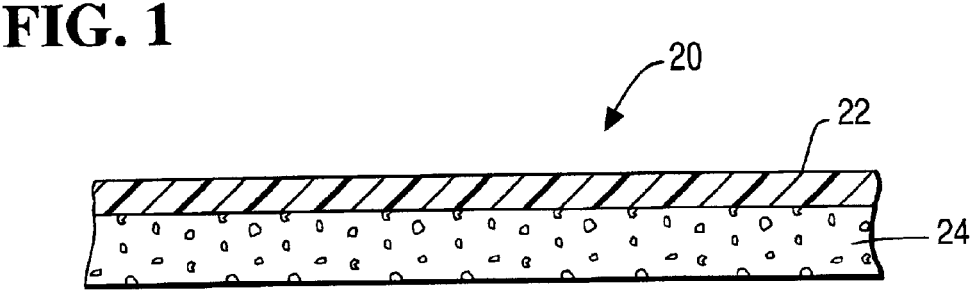
FIG. 1 illustrates a thermal transfer medium of the present invention having a single thermal transfer layer.

The aqueous coating formulations of this invention will provide a thermal transfer layer with a softening point below 200° C. on a substrate to form a thermal transfer medium such as a thermal transfer ribbon.

The aqueous coating formulations of this invention comprise at least one curing agent for epoxy resin and at least one thermoplastic resin and/or wax. The epoxy curing agents, thermoplastic resins and waxes that are used are solids at 20° C. and have a softening point below 200° C., preferably below 150° C. and most preferably in the range of 50° C. to 80° C., consistent with the softening temperature requirements of the thermal transfer layers to be formed. Such softening temperatures allow these components to melt mix with an epoxy resin when heated at temperatures in the range of 50° C. to 250° C., which is the range of operating temperatures for conventional thermal print heads.

The epoxy curing agents suitable for use in the coating formulations and thermal transfer media of this invention are emulsifiable in water or an aqueous medium. These epoxy curing agents are either solid at 20° C. or liquids encapsulated in a wax or thermoplastic resin that is solid at 20° C., so they can be isolated from the epoxy resin within the thermal transfer layers. The epoxy curing agent also softens at a temperature below 200° C. so as to melt mix with the epoxy resin at a temperature in the range of 50° C. to 250° C. The epoxy curing agents are preferably activated at temperatures within the operating temperature range of conventional thermal print heads i.e., about 50° C. to 250° C., more preferably 50° C. to 150° C., most preferably 60° C. to 100° C. Preferably the epoxy curing agents have at least two reactive groups and are highly reactive with epoxies so as to provide significant crosslinking in less than one second once activated by a conventional thermal print head of a thermal printer. Suitable epoxy curing agents will react with the epoxy resins epoxide groups, hydroxyl groups or both. Some epoxy curing agents may remain active at 20° C. once the reaction is initiated, i.e., once they are activated. To improve shelf stability of the thermal transfer medium, it is preferable for the epoxy curing agent to have an activation temperature in the range of 60° C.–100° C. Epoxy curing agents with activation temperatures above 100° C. can be used, provided the activation temperature is below the operating temperature of the print head to be used.

Examples of suitable epoxy curing agents include polyamines which are prepolymers or oligomers of a multifunctional amine (diamine), which have at least two primary or secondary amine groups. These polyamine prepolymers/oligomers are often referred to as modified amines. They are prepolymerized to provide a molecular weight which meets the melting point/softening point requirements. Examples of suitable modified amines are sold under the tradename Epi-cure P101 and Ancamine 2014FG sold by Shell Chemical Co. and Air Products, respectively. Aliphatic amine derivatives are another class of suitable polyamines. These include dicyandiamide (dicy) and imidazoles. Other suitable curing agents include polymercaptans, carboxylic acid functional polyester resins, phenol-formaldehyde resins and amino-formaldehyde resins. Included within the phenol-formaldehyde resins are resols and phenol-novolak resins.

In selecting a combination of epoxy resin and epoxy curing agent, their solubility in an aqueous medium is also considered. To prepare a single thermal transfer layer containing both epoxy curing agent and epoxy resin from an aqueous coating formulation, the epoxy curing agent must be emulsifiable, i.e., insoluble, in water or the aqueous liquid of the coating formulation so as to keep the curing agent separate from the epoxy resin within the thermal transfer layer.

The coating formulations of this invention also comprise an aqueous liquid such as water, which does not solubilize the epoxy curing agent or the one or more thermoplastic resins and waxes. The aqueous solution also does not solubilize the epoxy resin when present. The aqueous liquid can contain one or more organic solvents which are water soluble such as alcohols and glycols, provided they do not solubilize the epoxy curing agent or the epoxy resin.

The coating formulations and thermal transfer media of this invention comprise at least one thermoplastic resin and/or wax which is emulsifiable (insoluble) in water or an aqueous medium. The one or more thermoplastic resins and/or waxes serve as a binder in which the epoxy curing agent is dispersed to isolate the epoxy curing agent from the epoxy resin. The thermoplastic resins and waxes are solid at 20° C. and have a softening point below 200° C. Examples of suitable thermoplastic resins are polyvinyl chloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, xylene resin, ketone resin, petroleum resin, rosin or its derivatives, terpene resin, polyurethane resin, polyvinyl butyryl, synthetic rubber such as styrene-butadine rubber, nitrile rubber, acrylic rubber and ethylene-propylene rubber. Also suitable are polyvinyl alcohol, ethylene alkyl (meth)acrylate copolymers, styrene-alkyl (meth) acrylate copolymer, saturated polyesters and the like. It is recognized that mixtures of the above-identified resins can be used. In the viewpoint of transfer sensitivity, it is desirable for the thermoplastic resins to have a low softening temperature. From the viewpoint of image integrity, it is desirable for these resins to have a high softening temperature. The thermoplastic resin is preferably used in an amount of about 5 to 15 weight percent, particularly 10 weight percent based on the weight of total dry ingredients of the coating formulation which forms the thermal transfer layer.

Examples of suitable waxes include, conventional waxes used in thermal transfer ribbons such as carnauba wax, polyethylene wax, bee's wax, candillia wax, etc.

The epoxy resins suitable for use in the coating formulations and thermal transfer media of this invention are dispersible in water or an aqueous medium. Once coated and dried, these epoxy resins are solids at 20° C. so that they may be isolated from the epoxy curing agent within the thermal transfer layer. The epoxy resins also have a softening point below 200° C., preferably below 150° C., and most preferably in the range 50° C. to 80° C., consistent with the softening temperature requirements of the thermal transfer layer. Such softening temperatures allow the one or more epoxy resins to melt mix with the epoxy curing agent when heated at temperatures in the range of 50° C. to 250° C., such as by a conventional thermal print head, allowing the crosslinking reaction to proceed. Where the one or more epoxy resins have a softening point above 100° C., consideration must be given to employ a print head with an operating temperature sufficiently high to melt mix these components. Preferred epoxy resins have at least two oxirane groups so as to provide significant increases in molecular weight when crosslinked. Crosslinking can also be achieved through hydroxyl groups on the epoxy resin. At least a portion of the epoxy resins used has two or more oxirane groups. The preferred resins include the epoxy novolac resins obtained by reacting epichlorohydrin with phenol/formaldehyde condensates or cresol/formaldehyde condensates. These resins are generally B-stage resins in a partial state of cure which have multiple epoxide groups. A specific example of a suitable epoxy novolac resin is Epon 164 available from Shell Chemical Co.

Preferred epoxy resins also include polyglycidyl ether polymers obtained by reaction of epichlorohydrin with a polyhydroxy monomer such as bisphenol-A. A specific example is that sold under the tradename Araldite GT 7013 by Ciba-Geigy Corp. These polymers are generally linear and have terminal epoxide groups. Polymers with other backbone structures including aliphatic backbones are suitable if the melting/softening point requirements discussed above are met. These include those polyglycidyl ethers obtained by reaction of epichlorohydrin with 1,4-butanediol, neopentyl glycol or trimethlyol propane. The preferred epoxy resins discussed above are suitably reactive when melt mixed with most crosslinkers. The epoxy resins most preferred are typically dependent on the melting/softening points desired which is determined by molecular weight.

Thermal transfer medium 20, as illustrated in FIG. 1, is a preferred embodiment of this invention and comprises substrate 22 of a flexible material which is preferably a thin smooth paper or plastic-like ribbon and a thermal transfer layer 24. Tissue type paper materials such as 30–40 gauge capacitor tissue, manufactured by Glatz and polyester-type plastic materials such as 14–35 gauge polyester film manufactured by Dupont under the trademark Mylar are suitable. Polyethylene napthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within thermal print heads. The thickness is preferably 3 to 50 microns. If desired, the substrate or base film may be provided with a backcoating on the surface opposite the thermal transfer layer.

Thermal transfer layer 24 has a softening point below 200° C., preferably below 150° C. and most preferably from 50° C. to 80° C. so as to melt mix at a temperature in the range of 50° C. to 250° C. Softening temperatures within this range enable the thermal transfer medium to be used in conventional thermal transfer printers, which typically have print heads which operate at temperatures in the range of 100° C. to 250° C., more typically, temperatures in the range of 100° C. to 150° C. The term "softening point" as used herein, refers to the temperature at which a solid material becomes maleable and flowable.

The thermal transfer layer 24 comprises at least one epoxy resin, at least one epoxy curing agent for the epoxy resin and at least one thermoplastic resin or wax as described above. A sensible material is optionally added to this thermal transfer layer. The epoxy resin and epoxy curing agent are selected so as to quickly react when softened and melt mixed, preferably at the operating temperatures of a thermal print head, more preferably from 50° C. to 150° C. most preferably 60° C. to 100° C. Once melt mixed at these temperatures, some combinations of epoxy resin and epoxy curing agent may continue to react at 20° C., i.e. ambient temperature. The epoxy resins are solids at 20° C. so that they may be isolated from the epoxy curing agent within the thermal transfer layer. The epoxy resins also have a softening point below 200° C., preferably below 150° C., and most preferably in the range 50° C. to 80° C., consistent with the softening temperature requirements of the thermal transfer layer 24 described above. Such softening temperatures allow the one or more epoxy resin to melt mix with the epoxy curing agent when heated at temperatures in the range of 50° C. to 250° C., such as by a conventional thermal print head, allowing the crosslinking reaction to proceed. Where the one or more epoxy resins have a softening point above consideration must be given to employ a print head with an operating temperature sufficiently high to melt mix these components.

Figure 2:
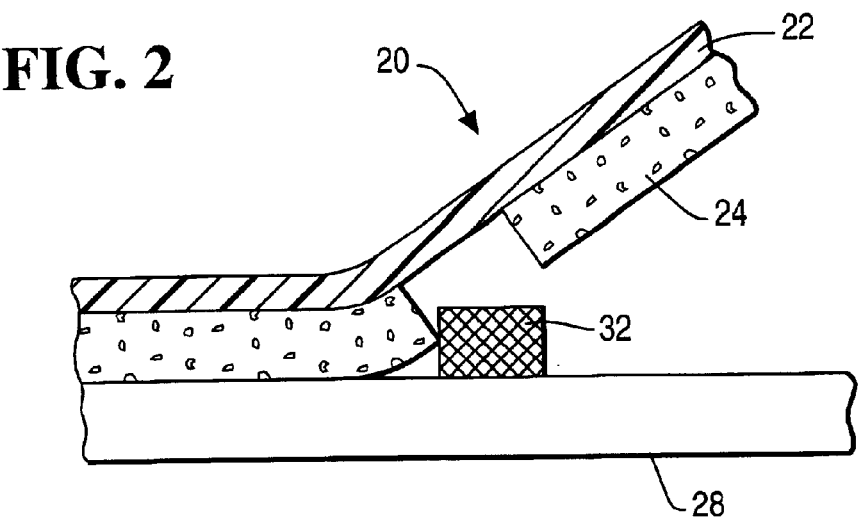
FIG. 2 illustrates a thermal transfer medium of FIG. 1 after thermal transfer to a substrate.

The thermal transfer medium 20 provides the advantages of thermal printing. When the thermal transfer layer 24 is exposed to the heating elements (thin film resistor) of the thermal print head, the epoxy resin and epoxy curing agent melt mix, reaction commences and the thermal transfer layer is transferred from the ribbon to the receiving substrate to produce a precisely defined image on the document. FIG. 2 illustrates image 32 on receiving substrate 28 following transfer from thermal transfer layer 24 of thermal transfer medium 20. Once initiated, the reaction proceeds rapidly, preferably until at least 99% complete.

Figure 3:
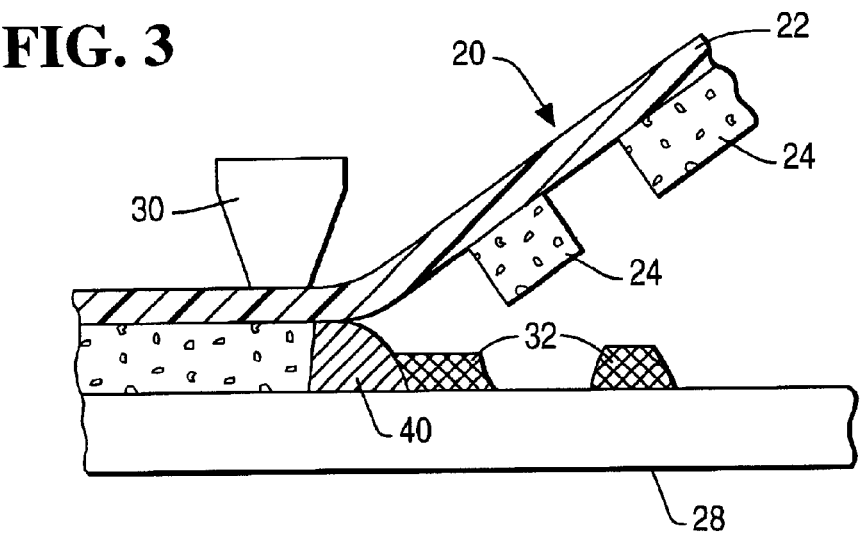
FIG. 3 illustrates a thermal transfer medium of FIG. 1 in a printing operation wherein thermal transfer is taking place.

FIG. 3 shows use of thermal transfer medium 20 in a printing operation. More particularly, FIG. 3 shows the heating of thermal transfer medium 20 by print head 30 where mixing and reaction of the epoxy curing agent and epoxy resin takes place during transfer of thermal transfer layer 24 onto receiving substrate 28. The heat from the print head 30 softens a portion of the thermal transfer layer 24 resulting in mixed portion 40. Reaction of the epoxy resin and epoxy curing agent in mixed portion 40 results in image 32.

Figure 4:
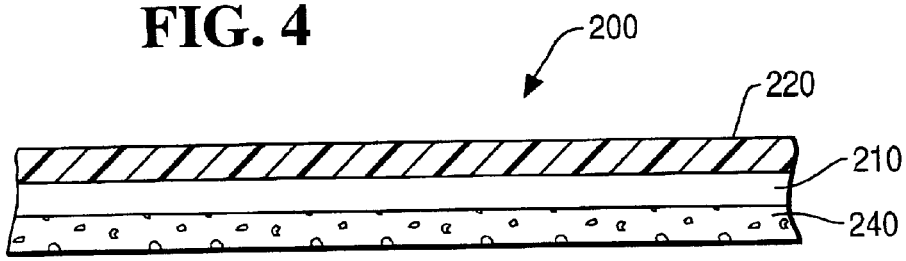
FIG. 4 illustrates a thermal transfer medium of the present invention having two thermal transfer layers.
Figure 5:
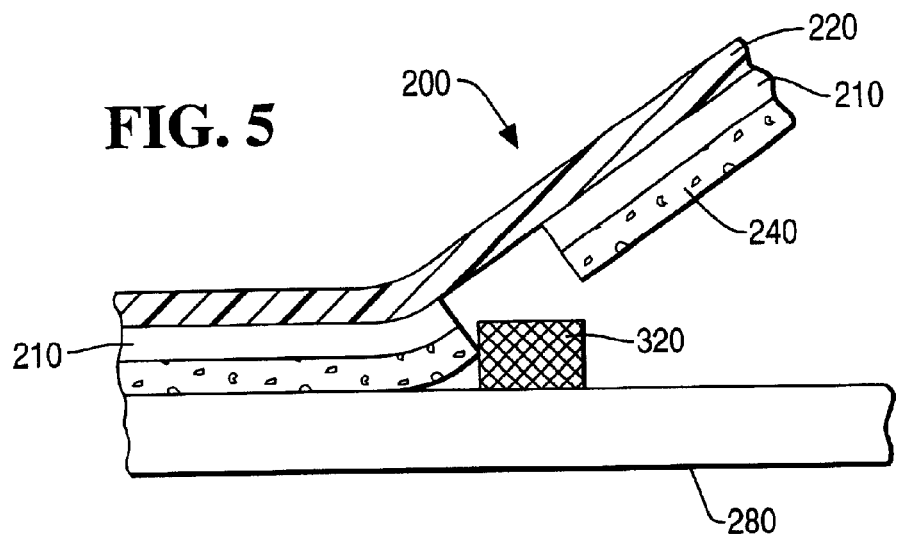
FIG. 5 illustrates a thermal transfer medium of FIG. 4, after thermal transfer to a substrate.
Figure 6:
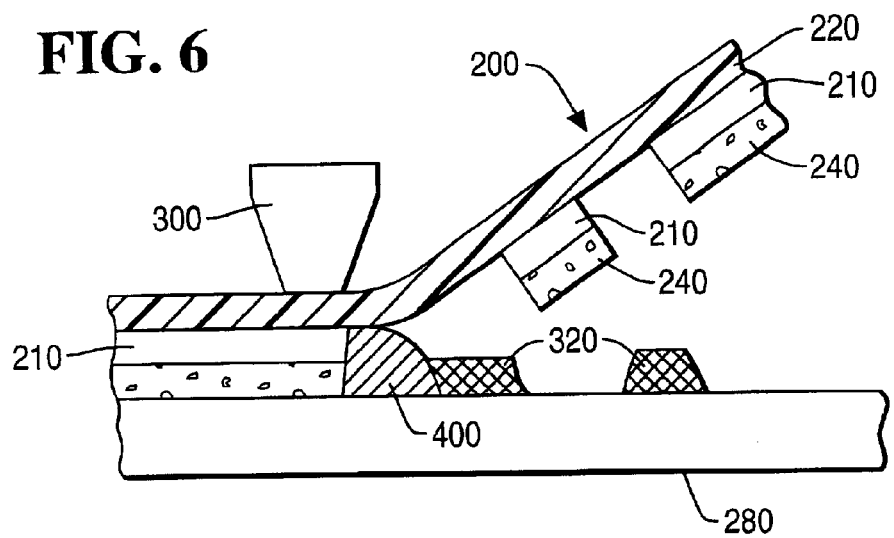
FIG. 6 illustrates a thermal transfer medium of FIG. 4 in a printing operation wherein thermal transfer is taking place.

FIGS. 4, 5, 6 show a thermal transfer medium 200 with two thermal transfer layers, 210 and 240 on substrate 220, which can be identical to substrate 20. The epoxy curing agent with at least one thermoplastic resin or wax are preferably within layer 210 and the epoxy resin is preferably within layer 240. These layers can be reversed. These layers may also optionally contain sensible material. When the thermal transfer medium 200 is exposed to the heating elements of a thermal print head, the layer with the epoxy resin melt mixes with the layer of epoxy curing agent to form image 320 on receiving substrate 280, as shown in FIG. 5. FIG. 6 shows the use of thermal transfer medium 200 in a printing operation. The heat and pressure from print head 300 softens a portion of the thermal transfer layers 210 and 240 resulting in mixed portion 400. Reaction of the epoxy resin and epoxy curing agent in mixed portion 400 results in image 320.

An optional component of the coating formulations and thermal transfer layers of this invention is a sensible material which is capable of being sensed visually, by optical means, by magnetic means, by electroconductive means or by photoelectric means. The sensible material is typically a coloring agent such as a dye or pigment or magnetic particles. Any water soluble or dispersible coloring agent used in conventional ink ribbons is suitable, including carbon black and a variety of organic and inorganic coloring pigments and dyes, examples of which include phthalocyanine dyes, fluorescent naphthalimide dyes and others such as cadmium, primrose, chrome yellow, ultra marine blue, titanium dioxide, zinc oxide, iron oxide, cobalt oxide, nickel oxide, etc. In the case of the magnetic thermal printing, the thermal transfer coating includes a magnetic pigment or particles for use in imaging or in coating operations to enable optical, human or machine reading of the characters. The magnetic thermal transfer ribbon provides the advantages of thermal printing while encoding or imaging the substrate with a magnetic signal inducible ink. The sensible material is typically used in an amount from about 5 to 50 parts by weight of the total dry ingredients for the coating formulation which provides the thermal transfer layer.

The coating formulation preferably comprises from 5–50 wt % solids. Of these solids, the epoxy resin preferably comprises from 30–65% by weight, when present. The epoxy curing agent preferably comprises 5% to 25% by weight of these solids and the one or more thermoplastic binder resins or waxes preferably comprises 5 to 25 wt % of these solids. The epoxy curing agent and epoxy resin are kept in separate phases by forming an aqueous emulsion of a polymer/wax binder and the epoxy curing agent and dispersing an aqueous dispersion of the epoxy resin in this emulsion to form a separate phase.

To enhance the activity of the epoxy curing agent, an accelerator may be incorporated in coating formulations or the thermal transfer layers of this invention, either within or out of the phase which contains the epoxy curing agent. Examples include tertiary amines and TGIC (triglycidylisocyanurate). The accelerators must have a softening temperature less than 200° C. Preferably, the softening point of the accelerator is compatible with the softening points of the epoxy resin and epoxy curing agent. The accelerator preferably functions at a temperature in the range of from 50° C. to 250° C. to accelerate the crosslinking reaction. Polymercaptans are liquids at room temperature. They must be encapsulated by the wax to behave like solids.

The coating formulations and thermal transfer layers of this invention may contain conventional water soluble or dispersible additives typically used in conventional thermal transfer media to aid in processing and performance of the thermal transfer layer. These include flexibilizers, weatherability improvers such a UV light absorbers, scratch and abrasion improvers and fillers. Amounts of up to 45 weight percent total additives, based on total solids, can be used in the thermal transfer layer.

The thermal transfer layers of this invention can be obtained by preparing a coating formulation of this invention and applying it to a substrate by conventional coating techniques such as a Meyer Rod or like wire-round doctor bar set up on a typical coating machine to provide the desired coating thickness which equates to a coating weight preferably between 1 and 3 g/m². A temperature of approximately 100° F. to 150° C. is maintained during the entire coating process, preferably below 120° F. After the coating formulation is applied to the substrate, preferably 3 to 50 μm thick, the substrate is passed through a dryer at an elevated temperature to ensure drying and adherence of the coating 24 onto the substrate 22 in making the transfer ribbon 20, but without activating the crosslinker. Upon coating this coating formulation onto a substrate, the epoxy curing agent remains dispersed in the thermoplastic/wax binder as part of a separate phase.

The thermal transfer layer can be fully transferred onto a receiving substrate such as paper or synthetic resin at a temperature in the range of 75° C. to 200° C. Following application, the receiving substrate may be exposed to a post-bake of up to 24 hours to ensure completion of the reaction and improve scratch resistance.

The coating formulation is preferably based on water but may contain water soluble organic solvents with a boiling point in the range of 150° C. to 190° C. The coating formulation preferably contains solids in an amount in the range of about 5 to 50 weight percent. Most preferably, the coating formulation contains about 20 percent solids.

To prepare a coating formulation of the present invention which forms the thermal transfer layers, one or more thermoplastic resin or wax binders is typically emulsified with an epoxy curing agent in an aqueous liquid. The emulsion is then mixed with an aqueous dispersion of the epoxy resin and sensible material is added thereto, with agitation at below room temperature for at least one hour. Grinding may be performed, if necessary, provided the temperature is kept below 50° C.

The images obtained from the thermal transfer layers of the present invention contain high molecular weight epoxy resin and therefore, show greater smear and scratch resistance. These images can be heated further to enhance scratch resistance. Temperature in the range of 80° C. to 300° C. for at least 15 minutes are typical. In more typical treatments, the images are heated to 100°–200° C. for 15 minutes to 1 hour.

The entire disclosure of all applications, patents and publications, cited above and below, are hereby incorporated by reference.

Without further elaboration, it is believed that one skilled in the art can, using the preceding description, utilize the present invention to its fullest extent. The following preferred embodiments are, therefore, to be construed as merely illustrative and not limitative of the remainder of the disclosure in any way whatsoever.

EXAMPLES

Example 1

An emulsion formulation with the components within Table 1 is prepared by emulsifying wax or resin and crosslinking agent in water. The resultant emulsion is then mixed with water-dispersed epoxy resin as seen in Table 2. Other additives may be added as necessary. The mixture may be ground as necessary to incorporate sensible agents. Grinding is not required if sensible agent particle size reduction is not required, or if water based dispersions of sensible agents are available.

TABLE 1

Emulsion Formulation

| | Use | % Dry |
|---|---|---|
| Water | Solvent | NA |
| Carnauba Wax[1] | Wax | 70.0 |
| Polyethylene Oxide[2] | Binder | 10.0 |
| Modified Polyamine (1)[3] | Hardener | 20.0 |

TABLE 2

Coating Formulation

|  | Use | % Dry |
|---|---|---|
| Water | Solvent | NA |
| Emulsion | Emulsion | 35.0 |
| O-Cresylic Novolac Resin[4] | Epoxy | 50.0 |
| Carbon Black[5] | Pigment | 15.0 |

The coating formulation is applied to polyester terephthalate (PET) film with coat weights in the range of 1–3 g/m$^2$ with conventional equipment.

Example 2

Emulsion and coating formulations are made in a similar manner to that of Example 1.

TABLE 1

Emulsion Formulation

|  | Use | % Dry |
|---|---|---|
| Water | Solvent | NA |
| Carnauba Wax[1] | Wax | 70.0 |
| Polyethylene Oxide[2] | Binder | 10.0 |
| Modified Polyamine (2)[6] | Hardener | 20.0 |

TABLE 2

Coating Formulation

|  | Use | % Dry |
|---|---|---|
| Water | Solvent | NA |
| Emulsion | Emulsion | 35.0 |
| Bisphenol A Epoxy Resin[7] | Epoxy | 50.0 |
| Carbon Black[5] | Pigment | 15.0 |

The coating formulation is applied to polyester terephthalate (PET) film with coat weights in the range of 1–3 g/m$^2$ with conventional equipment.

MATERIALS

|  | Chemical Name | Trade Name | Manufacturer | City | State |
|---|---|---|---|---|---|
| 1 | Carnauba Wax | Carnauba T-3 | Strahl & Pitsch | West Babylon | NY |
| 2 | Polyethylene Oxide | Polyox N-10 | Union Carbide | Houston | TX |
| 3 | Modified polyamine (1) | Epicure P101 | Shell Chemical Co. | Houston | TX |
| 4 | O-Cresylic Novolac Epoxy | Epi-Rez 6006 | Shell Chemical Co. | Houston | TX |
| 5 | Carbon black | Raven 1255 | Columbian Chemicals | Atlanta | GA |
| 6 | Modified polyamine (2) | Ancamine 2014FG | Air Products | Allentown | PA |
| 7 | Bisphenol A Epoxy Resin | Epi-Rez 3540 | Shell Chemical Co. | Houston | TX |

Print samples from a ribbon of Example 1 using a Zebra 140 XiII printer at speed 6" and energy 25, are tested for solvent resistance. The print samples are exposed to water, isopropyl alcohol, 409 Cleaner, gasoline, motor oil, and brake fluid, and subsequently passed over with a cotton swab. No smearing is detected for the print samples treated with water, isopropyl alcohol, 409 Cleaner, gasoline, or motor oil after 100 passes. The print samples started to smear at 50 passes after treatment with brake fluid.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermal transfer medium comprising a flexible substrate and a single thermal transfer layer, said thermal transfer layer having a softening point below 200° C. obtained from an aqueous coating formulation comprising a combination of:
   a) an aqueous emulsion of at least one thermoplastic resin and/or wax coemulsified with at least one epoxy curing agent which initiates crosslinking with an epoxy resin and
   b) an aqueous dispersion of at least one epoxy resin,
   said aqueous coating formulation further comprising an aqueous liquid which does not solubilize epoxy curing agents, thermoplastic resins, waxes or the epoxy resins, said single thermal transfer layer comprising:
   a) at least one epoxy resin,
   b) at least one epoxy curing agent which initiates crosslinking with an epoxy resin, and
   c) at least one thermoplastic resin and/or wax,
   wherein the epoxy curing agent is dispersed within the at least one thermoplastic resin and/or wax and separated from said epoxy resins so as to not react without melt mixing,
   wherein said epoxy resins, epoxy curing agents, thermoplastic resins and waxes each have a softening point below 200° C. so as to melt mix at a temperature in the range of 50° C. to 250° C., wherein each of the epoxy resins, thermoplastic resins and waxes are solid at 20° C. and each of the epoxy curing agents are either solid at 20° C. or encapsulated in a thermoplastic resin or wax which is solid at 20°C.

2. A thermal transfer medium as in claim 1, wherein the thermal transfer layer has a softening point in the range of 50° C.–80° C. and additionally comprises a sensible material.

3. A thermal transfer medium as in claim 1, wherein the thermal transfer layer comprises from 30–65 weight percent epoxy resin, 5 to 25 weight percent epoxy curing agent, and 5–25 weight percent of at least one thermoplastic resin and/or wax, based on the total weight of solids in the thermal transfer layer.

4. A thermal transfer medium as in claim 1, wherein the epoxy resin is diglycidyl ether bisphenol A and the epoxy curing agent is a polyamine, polymercaptans or dicyandiamides.

5. A thermal transfer medium as in claim 1, wherein the epoxy curing agent is activated to initiate crosslinking with the epoxy resin at temperatures in the range of 60° C.–100° C.

6. A thermal transfer medium as in claim 5, wherein the epoxy curing agent is active at 20° C. once activated.

7. A thermal transfer medium as in claim 1, wherein the thermal transfer layer comprises more than one epoxy curing agent.

8. A thermal transfer medium as in claim 1, wherein the epoxy curing agent is selected from the group consisting of polyamines, polymercaptans, dicydiandiamides, carboxylic acid functionalized polyesters, phenol-formaldehyde resins and amine-formaldehyde resins.

9. A thermal transfer medium as in claim 1 which additionally comprises a crosslinking accelerator within the thermal transfer medium which has a softening point below 200° C., and accelerates the crosslinking reaction between the epoxy resin and epoxy curing agent at temperatures in the range of from 50° C. to 250° C.

10. A thermal transfer medium comprising a flexible substrate and a thermal transfer layer which has a softening point below 200° C., said thermal transfer layer comprising two layers, a) a first layer comprising at least one epoxy resin, and b) a second layer obtained from an aqueous coating formulation comprising an aqueous emulsion of at least one thermoplastic resin and/or wax and at least one epoxy curing agent which initiates cross linking with an epoxy resin, wherein said epoxy curing agent is coemulsified with said at least one thermoplastic resin and/or wax, wherein said aqueous emulsion further comprises an aqueous liquid which does not solubilize the epoxy curing agents, thermoplastic resins or waxes, and wherein the at least one epoxy curing agent is dispersed within the at least one thermoplastic resin and/or wax and separated from the layer of epoxy resin so as not to react with the epoxy resin without melt mixing, wherein each of the epoxy resins, epoxy curing agents, thermoplastic resins and waxes have a softening point below 200° C. so as to melt mix at a temperature in the range of 50° C. to 250° C., the thermoplastic resins and waxes are solid at 200° C. and the epoxy curing agent is either solid at 20° C. or encapsulated in a wax or thermoplastic resin which is solid at 20°C.

11. A thermal transfer medium as in claim 10, wherein the thermal transfer layer has a softening point in the range of 50° C.–80° C. and additionally comprises a sensible material in said first layer, said second layer or both.

12. A thermal transfer medium as in claim 10 wherein the second layer of the thermal transfer layer comprises from 5 to 95 wt % epoxy curing agent and from 95 to 5 weight % at least one thermoplastic resin and/or wax.

13. A thermal transfer medium as in claim 10, wherein the epoxy resin is diglycidyl ether bisphenol A and the epoxy curing agent is a polyamine, polymercaptans or dicyandiamides.

14. A thermal transfer medium as in claim 10, wherein the epoxy curing agent is activated to initiate crosslinking with the epoxy resin at temperatures in the range of 60° C.–100° C.

15. A thermal transfer medium as in claim 14, wherein the epoxy curing agent is active at 20° C. once activated.

16. A thermal transfer medium as in claim 10, wherein the thermal transfer layer comprises more than one epoxy curing agent.

17. A thermal transfer medium as in claim 10, wherein the epoxy curing agent is selected from the group consisting of polyamines, polymercaptans, dicydiandiamides, carboxylic acid functionalized polyesters, phenol-formaldehyde resins and amine-formaldehyde resins.

18. A thermal transfer medium comprising a flexible substrate and a single thermal transfer layer, said thermal transfer layer having a softening point below 200° C. obtained from an aqueous coating formulation comprising a combination of:

a) an aqueous dispersion of at least one thermoplastic resin and/or wax codispersed with at least one epoxy curing agent which initiates crosslinking with an epoxy resin and b) an aqueous dispersion of at least one epoxy resin, said aqueous coating formulation further comprising an aqueous liquid which does not solubilize epoxy curing agents, thermoplastic resins, waxes or the epoxy resins, said single thermal transfer layer comprising:

a) at least one epoxy resin, b) at least one epoxy curing agent which initiates crosslinking with an epoxy resin, and c) at least one thermoplastic resin and/or wax, wherein the epoxy curing agent is dispersed within the at least one thermoplastic resin and/or wax and separated from said epoxy resins so as to not react without melt mixing, wherein said epoxy resins, epoxy curing agents, thermoplastic resins and waxes each have a softening point below 200° C. so as to melt mix at a temperature in the range of 50° C. to 250° C., wherein each of the epoxy resins, thermoplastic resins and waxes are solid at 20° C. and each of the epoxy curing agents are either solid at 20° C. or encapsulated in a thermoplastic resin or wax which is solid at 20° C.

19. A thermal transfer medium comprising a flexible substrate and a thermal transfer layer which has a softening point below 200° C., said thermal transfer layer comprising two layers, a) a first layer comprising at least one epoxy resin, and b) a second layer obtained from an aqueous coating formulation comprising an aqueous disperson of at least one thermoplastic resin and/or wax and at least one epoxy curing agent which initiates crosslinking with an epoxy resin, wherein said epoxy curing agent is codispersed with said at least one thermoplastic resin and/or wax, wherein said aqueous dispersion further comprises an aqueous liquid which does not solubilize the epoxy curing agents, thermoplastic resins or waxes, and wherein the at least one epoxy curing agent is dispersed within the at least one thermoplastic resin and/or wax and separated from the layer of epoxy resin so as not to react with the epoxy resin without melt mixing, wherein each of the epoxy resins, epoxy curing agents, thermoplastic resins and waxes have a softening point below 200° C. so as to melt mix at a temperature in the range of 50° C. to 250° C., the thermoplastic resins and waxes are solid at 20° C. and the epoxy curing agent is either solid at 20° C. or encapsulated in a wax or thermoplastic resin which is solid at 20° C.

* * * * *

UNITED STATES PATENT AND TRADEMARK OFFICE
CERTIFICATE OF CORRECTION

PATENT NO. : 6,790,493 B2
DATED : September 14, 2004
INVENTOR(S) : Dashiell, David M.

It is certified that error appears in the above-identified patent and that said Letters Patent is hereby corrected as shown below:

Column 11,
Line 30, after "at" delete "200°C" and insert -- 20°C --.

Signed and Sealed this

Third Day of May, 2005

JON W. DUDAS
*Director of the United States Patent and Trademark Office*